United States Patent
Kurzynski et al.

(10) Patent No.: US 7,155,457 B1
(45) Date of Patent: Dec. 26, 2006

(54) METHOD AND APPARATUS FOR MANAGING MEMORY IN A WORKSTATION

(75) Inventors: David W. Kurzynski, Vernon Hills, IL (US); Frank J. Owen, Elmhurst, IL (US); Bradley E. Koehn, Milwaukee, WI (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 0 days.

(21) Appl. No.: 09/476,618

(22) Filed: Dec. 31, 1999

(51) Int. Cl.
*G06F 17/30* (2006.01)

(52) U.S. Cl. .................................... 707/200

(58) Field of Classification Search ................ 707/200, 707/203, 1, 3, 100, 104.1, 2, 10, 101; 709/203, 709/217, 223; 386/123; 364/413.01; 705/1, 705/14; 715/513, 514, 529, 907, 512, 759; 378/58; 345/156
See application file for complete search history.

(56) References Cited

U.S. PATENT DOCUMENTS

| | | | | |
|---|---|---|---|---|
| 5,289,574 A | * | 2/1994 | Sawyer | 715/759 |
| 5,359,512 A | * | 10/1994 | Nishihara | 382/128 |
| 5,367,698 A | * | 11/1994 | Webber et al. | 709/203 |
| 5,734,915 A | * | 3/1998 | Roewer | 715/512 |
| 6,101,506 A | * | 8/2000 | Ukai et al. | 707/203 |
| 6,137,860 A | * | 10/2000 | Ellegood et al. | 378/58 |
| 6,448,956 B1 | * | 9/2002 | Berman et al. | 345/156 |
| 6,501,905 B1 | * | 12/2002 | Kimura | 386/126 |

\* cited by examiner

*Primary Examiner*—Etienne P. LeRoux
(74) *Attorney, Agent, or Firm*—Andrus, Sceales, Starke & Sawall, LLP

(57) ABSTRACT

A workstation including a memory management scheme is disclosed herein. The memory management scheme permits a large number of files to be open on the workstation. The memory management scheme includes a prioritization scheme such that the least relevant files are unloaded from the workstation memory when space is needed to download newly opened files. The memory management scheme further includes saving settings of files unloaded from the workstation memory so that they can be reloaded when needed, with a user perceiving the unloaded files as being continually open.

6 Claims, 2 Drawing Sheets

METHOD AND APPARATUS FOR MANAGING MEMORY IN A WORKSTATION

BACKGROUND OF THE INVENTION

The present invention relates generally to memory management. More particularly, the present invention relates to workstations in an image handling system equipped with memory management schemes.

Presently in a hospital, medical imaging devices are preferably networked with a central image management system such as a picture archival and communications system (PACS). Medical imaging devices utilize, among others, electromagnetic radiation, x-rays, sonic waves, and photonic energy to produce images of a subject of interest, such as a patient, to aid in diagnosis and treatment of illnesses. For example, ultrasound devices are useful for viewing fetuses during prenatal care in a pregnancy. Magnetic resonance (MR) imaging systems can produce images of a wide range of tissues.

The central image management system includes a central storage unit coupled to a plurality of image workstations or terminals, such as PACS workstations. The central storage unit is configured to archive images produced by the plurality of medical imaging devices, and to retrieve images for display on one or more image workstations. Thus, the hospital can provide a plurality of medical imaging devices located through the hospital, and images produced from any of these medical imaging devices can then be retrieved and viewed by any of the plurality of image workstations.

Images are archived in the central management system in sets relating to examinations, in which each examination includes a set of images acquired at a particular time relating to a particular problem (or ailment) of a particular patient. When the physician or user on the image workstation accesses images, examinations including these images (i.e., the image data) need to be downloaded from the central storage unit to that image workstation before such images can be displayed, and thus viewed, on that image workstation. During a session on the image workstation, a plurality of examinations are typically viewed by the physician. Moreover, the physician may desire to sequentially view images from different examinations in a relatively short order (i.e., moving back and forth among different examinations).

Unfortunately, conventional image workstations are ill suited to effectively handle such examination viewing behavior or preferences. For example, a conventional image workstation only permits a few examinations to be readily accessible to the physician at any given time because the memory capacity of the workstation is such that only up to a few examinations can be stored on it. If the memory is full, the workstation may not permit any new examination to be accessed, or one or more of the downloaded or stored examinations would have to be unloaded (and thus no longer readily accessible to the physician) before any new examination can be accessed (i.e., downloaded from the central storage unit to the memory and displayed on the workstation). Thus, the physician is either limited to viewing only images from the few examinations already downloaded into the memory of the workstation, or waiting as each examination (not currently in the memory) requested by the physician is downloaded and displayed on the workstation. Otherwise the memory size requirement of the workstation would become extremely large and too costly.

Thus, there is a need for a workstation that permits a large number of examinations to be readily accessible to a user at any given time. There is a further need for a workstation that includes a memory management scheme to optimize the ready accessibility of a large number of relevant examinations to a user.

BRIEF SUMMARY OF THE INVENTION

One embodiment of the invention relates to a method for managing a memory in a workstation when a size of user selected files exceeds the memory capacity in the workstation. The method includes prioritizing the user selected files using a prioritization scheme. The method further includes unloading from the memory of the workstation a unload file having a lower priority than at least one of the user selected files stored in memory. The unload file includes at least a portion of at least one of the user selected files.

Another embodiment of the invention relates to a system for managing a memory in a workstation when a size of user selected files exceeds the memory capacity in the workstation. The system includes means for prioritizing the user selected files using a prioritization scheme. The system further includes means for unloading a unload file having a lower priority than at least one of the user selected files stored in memory. The unload file includes at least a portion of at least one of the user selected files and the means for prioritizing is coupled to the means for unloading.

Still another embodiment of the invention relates to a system for managing a memory in a workstation when a size of user selected files exceeds the memory capacity in the workstation. The system includes a processor configured to prioritize the user selected files using a prioritization scheme. The system further includes the memory configured to unload a unload file having a lower priority than at least one of the user selected files stored in memory. The unload file includes at least a portion of at least one of the user selected files. And the processor is coupled to the memory.

BRIEF DESCRIPTION OF THE DRAWINGS

The preferred embodiment will become more fully understood from the following detailed description, taken in conjunction with the accompanying drawings, wherein like reference numerals denote like elements, in which.

DETAILED DESCRIPTION OF THE INVENTION

Figure 1:
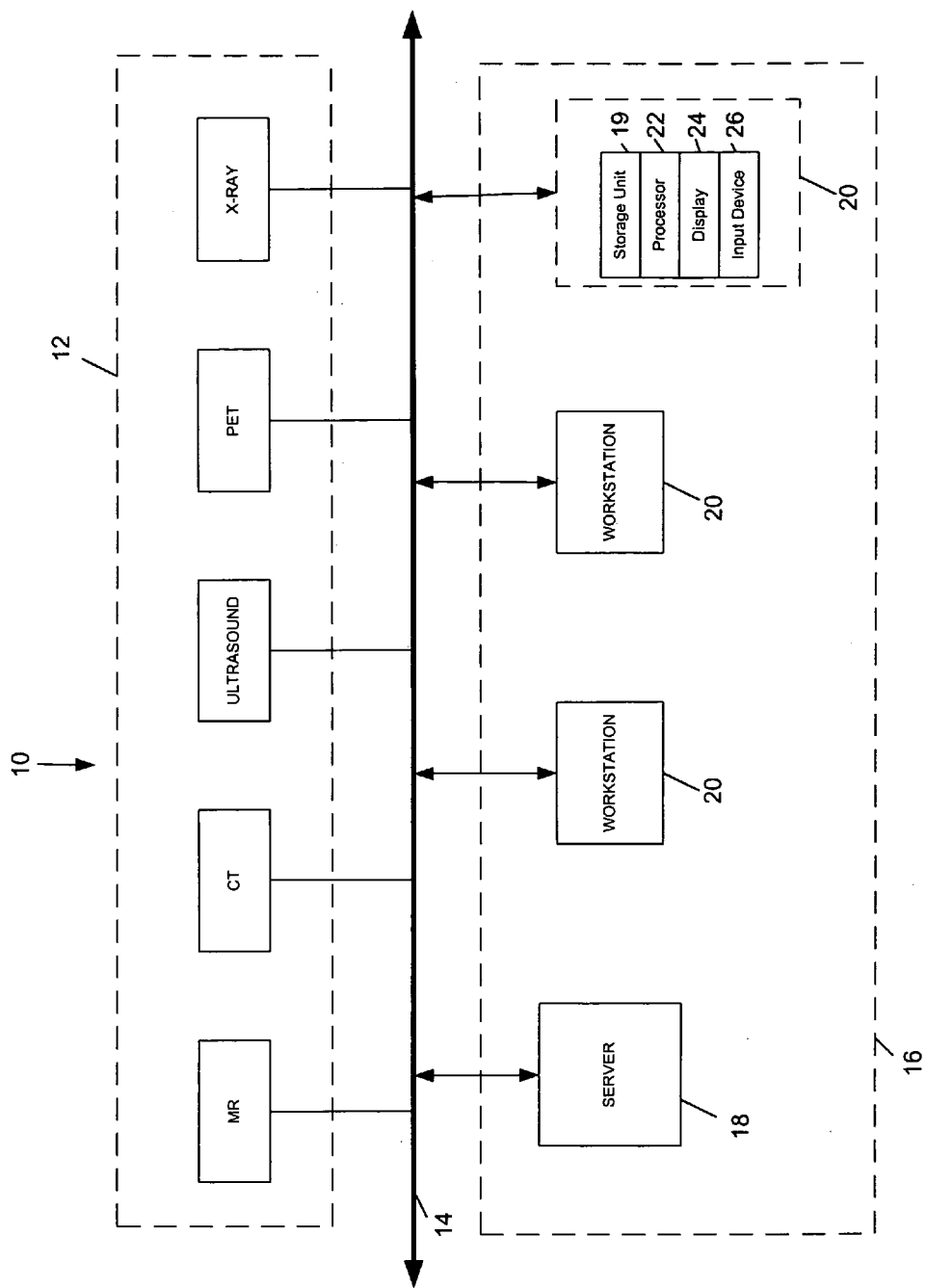
FIG. 1 is a block diagram of an image handling system which employs an embodiment of the present invention.

Referring to FIG. 1, there is shown the major components of an image handling system 10. Image handling system 10 includes imaging devices 12, a communications network 14, and an image management system 16. Each of the imaging devices 12 is coupled to the communications network 14 and the communications network 14 is coupled to the image management system 16.

Imaging devices 12 include, but are not limited to, magnetic resonance (MR) imaging devices, computerized tomography (CT) devices, ultrasound devices, nuclear imaging devices, x-ray devices, and a variety of other types of imaging devices. It should be understood that imaging devices 12 are not limited to medical imaging devices and can also include scanners and imaging devices from other fields. Imaging devices 12 are located throughout a facility, such as a hospital.

Image management system 16 includes an image manager 18 and a plurality of image workstations 20. Preferably, image management system 16 is a picture archival and communication system (PACS), image manager 18 is a PACS server, and the plurality of image workstations 20 are PACS workstations or terminals. It should be understood, however, that image management system 16 can be any image archival, management, and retrieval apparatus.

Image manager 18 includes an information storage unit for short-term storage and retrieval, and an archival storage unit (e.g., an optical disc storage and optical disc reader system) for long-term storage and retrieval (not shown). Each of the plurality of workstations 20 is a computer system or terminal, including a memory 19, a processor 22, a display 24, and an input device 26. Input device 26 can include, but is not limited to, a mouse, a joystick, a keyboard, a trackball, a touch screen, a light wand, and a voice control. Image manager 18 is coupled to each of imaging devices 12 and the plurality of workstations 20, via communications network 14 (e.g., an ethernet, fiber optic, or other applicable communications network communication). The plurality of workstations 20 can be located throughout the hospital and need not be proximate imaging devices 12 or image manager 18.

During an examination of a subject of interest, such as a portion of a patient's anatomy, one or more imaging devices 12 are used to acquire images of the subject of interest. Each acquired image is in a digitized data format, preferably in a DICOM or other suitable format, and is communicated from imaging devices 12 to image manager 18 via communications network 14. Image manager 18 archives the image data representative of each acquired image, also referred to as an image file, with appropriate identifiers and links such that the image file can be selectively retrieved. Once image files have been archived in image manager 18, image files and other relevant information, such as the patient's medical history, can be selectively retrieved and accessed on any one of the plurality of workstations 20 or other information retrieval devices coupled to communications network 14.

Preferably each set of images are acquired of a particular patient having a particular problem (or ailment) at a particular time. The image set, or more preferably the image data or files corresponding to the image set, are archived in image manager 18 with appropriate links to that patient's information (e.g., medical history and administrative information). In this manner, each set of images relate to an examination of a patient. For example, a patient with a broken arm may have a first set of images taken of his arm when the break initially occurs, a second set of images taken of the same arm a month later, and a third set of images taken after the cast has been removed. Then the first, second, and third set of images would comprise, respectively, a first, second, and third examination of a particular problem (i.e., broken arm bone for that patient).

On average, each examination will include about 50 megabytes (MB) of image data. However, the number and size of images comprising an examination can vary widely depending on, among others, the type of imaging device used to acquire the images, the nature of the patient's problem, and the patient's physiology. For example, a x-ray examination could contain four to five images, each x-ray image being approximately 10 MB. In contrast, a MR exam may include 250 images at about 0.25 MB per image.

In one embodiment, a user, such as a physician or radiologist, manipulates information (from image manager 18) in any one of the plurality of image workstations 20 via a graphical user interface (GUI) and input device 26 included in each workstation 20. The GUI includes a work list selector window (not shown) from which the user selects one or more examinations (also referred to as exams) that he desires to view. The image data corresponding to these exams are retrieved from image manager 18 and downloaded to memory 19 of that particular workstation 20. Any of the images corresponding to these exams can then be displayed on display 24 in real-time or quasi-real-time. Because these exams, and hence the images contained therein, are readily accessible to the user, the user can rapidly switch back and forth among different exams or images. Moreover, the user can manipulate images to enhance their diagnostic value (i.e., change original image viewing settings) such as changing the contrast of an image, rotating an image, etc.

A memory management scheme 50 included in processor 22 of each workstation 20 permits a large number of exams to be open or perceived to be open (i.e., readily accessible) at any given time. The open exams can be any combination of exams such as a plurality of exams of a single patient or exams of different patients. Workstation 20 is configured such that when the user opens an exam, one or more images corresponding to that exam (or other exam information such as a start page or an exam content page) will be displayed on display 24. If there are more than one open exam or the user has specified a plurality of images to be open, then each of these pages or windows relating to an exam or image will be displayed on display 24 in a sheet mode (i.e., in a tile-like formation across display 24) or in a stack mode (i.e., stacked one behind another like a stack of cards across display 24). At any given time, this multitude of opened exams and/or images will have a certain viewing sequence (also referred to as a viewing stack or order) based on the order in which the user opened and/or manipulated these exams and/or images.

Figure 2:
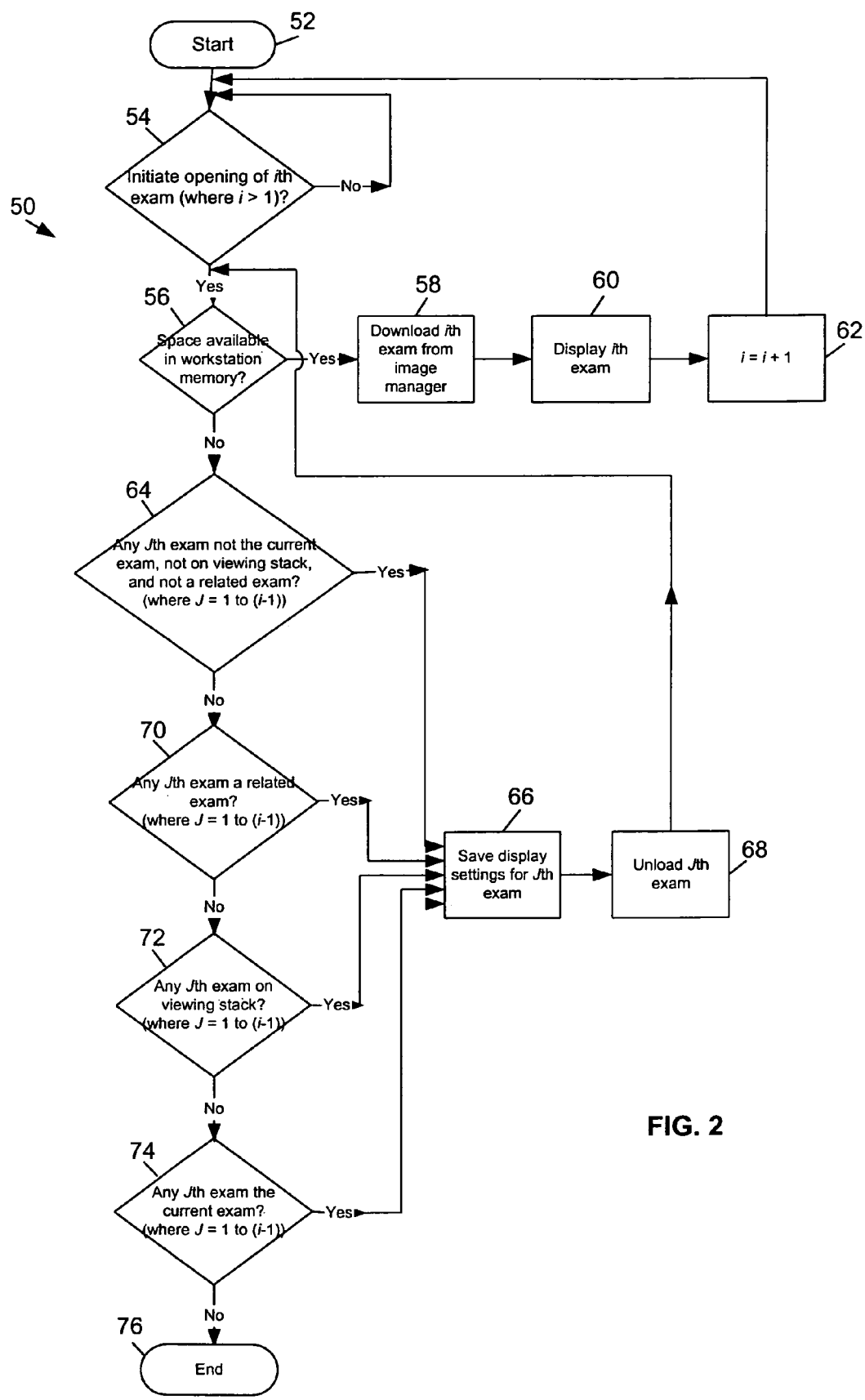
FIG. 2 is a flow chart of a memory management scheme included in an image workstation which comprises a part of the image handling system of FIG. 1.

Referring to FIG. 2, there is shown a memory management scheme 50 included in each workstation 20. Memory management scheme 50 includes a start step 52, an initiate opening of ith exam step 54, a workstation memory capacity inquiry step 56, a download step 58, a display exam step 60, an incrementor step 62, a lowest exam priority inquiry step 64, a save settings step 66, a unload exam step 68, a related exam priority inquiry step 70, a viewing stack priority inquiry step 72, a current exam priority inquiry step 74, and an end step 76. Scheme 50 is configured such that a large number of exams can be opened at any given time in workstation 20 without having to increase the size of memory 19 of workstation 20. Scheme 50 utilizes known user exam viewing patterns, the current user's viewing behavior, and a prioritization of the open exams to optimize the storage capacity of memory 19 and the number of exams that seem readily accessible from the user's perspective.

Start step 52 and initiate opening step 54 are carried out when at least one exam is already open and another exam is desirous of being opened (i.e., an ith exam to be opened, where i>1). Before the ith exam can be opened, the image data corresponding thereto need to be downloaded to memory 19. Hence, step 56 inquires as to the available amount of space in memory 19. If there is sufficient space in memory 19 to fully download the image data corresponding to the ith exam, then step 56 directs the download to be carried out via the download step 58. After the image data (and possibly also the patient information) corresponding to the ith exam have been downloaded from image manager 18 in step 58, any image within the ith exam can be displayed on display 24 in step 60. Incrementor step 62 readies workstation 20 to accept the opening of a next exam (i.e., i=i+1).

Otherwise, if there is not enough space in memory 19 to download the image data corresponding to the ith exam, then all the open exams (i.e., all Jth exams, where J=1 to (i−1)) are prioritized to determine which open exam should be unloaded from memory 19 to free up space.

Scheme 50 provides a prioritization scheme comprising four priority levels: (1) a current exam priority, (2) a viewing stack priority, (3) a related exam priority, and (4) a lowest exam priority. The current exam priority is the top priority level and is only given to a current exam (also referred to as a currently viewed exam) being viewed by the user. Since the current exam would have the most relevance to the user at that moment in time, it is the open (i.e., Jth) exam least likely to be unloaded to make way for the ith exam. The viewing stack priority is the priority level below the current exam priority. This priority is given to all open exams, except the current exam, currently being displayed on display 24 in the viewing stack. Exams included in the viewing stack are likely to be viewed as the user makes his way through the stack. Thus, these exams are the second least likely to be unloaded from memory 19.

The related exam priority is the priority level below the viewing stack priority. This priority is given to all open exams that are related to the current exam. One patient's exams for a particular problem or the same portion of his anatomy comprise a set of exams, and when one of these exams is the current exam, then the remaining exams in this set of exams are referred to as related exams to the current exam. For example, continuing the example above of the broken arm, the first, second, and third exams of the broken arm can be categorized as related exams to each other. Lastly, the lowest exam priority is the lowest priority level; exams in this priority level are the first to be unloaded from memory 19. Any open exam that is not the current exam, is not part of the viewing stack, and is not a related exam is given the lowest exam priority.

This prioritization scheme is shown in steps 64–74. Step 64 identifies any Jth exam (where (i−1) is the total number of open exams and J=1 to (i−1)) belonging to the lowest exam priority level. If any Jth exam can be given the lowest exam priority, then that Jth exam will be unloaded from memory 19. However, before the unloading step 68, the display or viewing settings of the Jth exam to be unloaded will be saved in workstation 20 in the save step 66. Save step 66 permits this unloaded exam to be redisplayed as it was last viewed by the user, when it is reloaded onto memory 19 at a later point in time. Thus, although this Jth exam will have to be reloaded onto memory 19 for the user to view it again, save step 66 makes it appear to the user as if this Jth exam was never unloaded from memory 19. In other words, the user will perceive this Jth exam as being continually "open."

After the unload step 68, scheme 50 checks again for sufficiency of space in memory 19 by returning to step 56. If unloading one Jth exam has freed up enough space to download the ith exam, then downloading can proceed with the downloading branch of scheme 50 (i.e., steps 58–62). Otherwise, if there still isn't enough space available in memory 19, then step 56 directs the prioritization scheme to continue with steps 64–74 to unload more exams.

If none of the open exams can be categorized within the lowest exam priority level, then the related exam priority inquiry step 70 is carried out. If none of the open exams is a related exam, then the viewing stack priority inquiry step 72 is carried out. Lastly, if none of the open exams is an exam on the viewing stack, then the current exam priority inquiry step 74 is carried out. Similar to the discussion above for step 64, if any Jth exam satisfied the condition specified in any of steps 70, 72, 74, then the save step 66 and the unload step 68 follows.

In the current exam priority step 74, arriving at the "no" branch indicates that none of the open exams fall within any of the four priority levels. In this situation, step 74 directs the prioritization to end with end step 76. It is likely that some sort of error has occurred and workstation 20 may display an error message or request the user to reinitiate opening of the ith exam.

Alternatively, it is contemplated that different prioritization schemes than discussed above may be implemented. For example, the viewing stack priority step 72 may be omitted. It is also contemplated that instead of unloading the first open exam in the inquiry that is in the lowest possible priority level, memory management scheme 50 may also inquire as to the sizes of the image data corresponding to the open exams. Then, for example, if two exams are of the same priority level and either one is suitable to unload, scheme 50 may unload the exam taking up greater or equal memory space in comparison to the ith exam to be downloaded.

In this manner, memory management scheme 50 permits the user to open a very large number of exams during a session on workstation 20. Memory management scheme 50 also permits actually closed exams (i.e., exams unloaded from memory 19) to be perceived by the user as still being open by saving the last display or viewing settings for each to-be-unloaded exams and by utilizing the prioritization scheme to optimize unloading the least relevant exam(s) possible.

While the embodiments and application of the invention illustrated in the figures and described above are presently preferred, it should be understood that these embodiments are offered by way of example only. For example, it is contemplated that the invention may be applied to systems other than imaging systems which can benefit from optimization of memory usage. In another example, memory management scheme 50 may selectively unload only a portion of the image data corresponding to an exam instead of unloading the entire exam. In still another example, the last display or viewing settings of an exam may be saved in image manager 18 and be linked to a user identifier (i.e., a login identifier) such that the exam may be opened on any of the workstations 20 in a subsequent session and be displayed as it was last displayed by that user. Accordingly, the present invention is not limited to a particular embodiment, but extends to various modifications that nevertheless falls within the scope of the appended claims.

What is claimed is:

1. A method for managing a memory in a workstation when a size of user selected medical image files exceeds the memory capacity in the workstation, the method comprising the steps of:

opening a plurality of medical image files to display a plurality of medical images;

prioritizing the plurality of medical image files using a prioritization scheme having at least three levels including a first level comprising a currently viewed medical image;

a second level comprising medical images in a viewing stack; and a third level comprising medical images related to medical images with a higher priority, wherein the medical images in the viewing stack and the medical images related to medical images with a higher priority are not currently viewed medical images;

and further wherein the medical images from the first level are designated with a higher priority than the medical images of the second level and the medical images of the second level are designated with a higher priority than the medical images of the third level; and unloading from the memory of the workstation a medical image file having a lower priority than at least one of the open medical image files stored in memory, wherein the unloaded medical image file includes at least a portion of at least one of the open medical images.

2. The method of claim 1, wherein the third level only comprises open medical images related to open medical images from the first level.

3. The method of claim 1, further comprising the step of saving the visual display settings of the unloaded medical image file such that if the unloaded medical image file is not closed and a user decides to redisplay the unloaded image file, the unloaded medical image file appears virtually open to the user and as if the unloaded medical image file had not been unloaded.

4. The method of claim 1, wherein the unloaded open medical image file is transferred to a storage device connected to the workstation by a network.

5. A system for managing memory in a workstation when a size of user selected medical image files exceeds the memory capacity in the workstation, the system comprising:

a processor configured to prioritize the user selected medical image file using a prioritization scheme having at least three levels including a first level comprising a currently viewed medical image;

a second level comprising medical images in a viewing stack; and a third level comprising medical images related to medical images with a higher priority, wherein the medical images in the viewing stack and the medical images related to medical images with a higher priority are not currently viewed medical images;

and further wherein the medical images from the first level are designated with a higher priority than the medical images of the second level and the medical images of the second level are designated with a higher priority than the medical images of the third level; and the memory configured to unload a medical image file having a lower priority than at least one of the user selected medical image files stored in memory, wherein the unloaded medical image file includes at least a portion of at least one of the user selected medical images and wherein the processor is coupled to the memory.

6. The system of claim 5, wherein the third level only comprises files related to files from the first level.

* * * * *